United States Patent [19]

Lindbom

[11] Patent Number: 4,581,893
[45] Date of Patent: Apr. 15, 1986

[54] MANIPULATOR APPARATUS WITH ENERGY EFFICIENT CONTROL

[75] Inventor: Torsten H. Lindbom, Brookfield, Conn.

[73] Assignee: Unimation, Inc., Danbury, Conn.

[21] Appl. No.: 369,278

[22] Filed: Apr. 19, 1982

[51] Int. Cl.[4] .............................. F15B 9/03; F15B 9/02
[52] U.S. Cl. ........................................ 60/368; 60/371; 60/375; 60/413; 60/414
[58] Field of Search .................. 60/368, 371, 375, 413, 60/414, 468, 494

[56] References Cited

U.S. PATENT DOCUMENTS

| | | | |
|---|---|---|---|
| Re. 31,208 | 4/1983 | Watanabe | 318/568 |
| 2,286,571 | 6/1942 | Pollard | 91/45 |
| 3,238,722 | 3/1968 | Berkman et al. | 60/414 |
| 3,551,656 | 12/1970 | Wohlfeil | 235/151.11 |
| 3,555,252 | 1/1971 | Garden | 235/151.1 |
| 3,661,051 | 5/1972 | Dunne et al. | 91/35 |
| 3,744,032 | 7/1973 | Engelberger et al. | 340/172.5 |
| 3,757,187 | 9/1973 | Arai | 318/562 |
| 3,770,947 | 11/1973 | Deily | 235/151.11 |
| 3,825,731 | 7/1974 | Kobayashi et al. | 235/151.11 |
| 3,889,238 | 6/1975 | Sakurai | 340/172.5 |
| 3,917,930 | 11/1975 | Davey et al. | 235/151.1 |
| 3,969,723 | 7/1976 | Kennicott | 340/172.5 |
| 3,974,432 | 8/1976 | Thompson | 318/562 |
| 4,021,651 | 5/1977 | Mitsuhasi et al. | 235/151.11 |
| 4,086,522 | 4/1978 | Engelberger et al. | 318/568 |
| 4,105,937 | 8/1978 | Tuda et al. | 318/568 |
| 4,132,937 | 1/1979 | Engelberger et al. | 318/568 |
| 4,140,953 | 2/1979 | Dunne | 318/568 |
| 4,150,326 | 4/1979 | Engelberger et al. | 318/563 |
| 4,163,183 | 7/1979 | Engelberger et al. | 318/568 |
| 4,194,365 | 3/1980 | Stoufflet et al. | 60/468 |
| 4,362,978 | 12/1982 | Pollard et al. | 318/568 |
| 4,399,653 | 8/1983 | Pylat, Jr. | 60/368 |

Primary Examiner—Robert E. Garrett
Assistant Examiner—J. M. Husar
Attorney, Agent, or Firm—Mason, Kolehmainen, Rathburn & Wyss

[57] ABSTRACT

Manipulator apparatus is provided with an energy efficient control arrangement. The control arrangement in a point-to-point mode of operation utilizes a servo valve to selectively admit fluid from a pressurized source to one end of a cylinder. A piston is slidably mounted within the cylinder and connected to move a manipulator arm that is movable in a plurality of axes. The servo valve is closed when a predetermined arm velocity is reached and a bypass valving arrangement is opened to interconnect the ends of the cylinder. At a predetermined position of the manipulator arm, the control arrangement closes the bypass valving arrangement and the manipulator arm is decelerated as the arm approaches the desired final position. The pressurized source includes an accumulator and two high pressure check valves that each connect a respective end of the cylinder to the accumulator when the pressure at the respective end of the cylinder exceeds the accumulator pressure to supply pressurized fluid to other axes of the manipulator. The control arrangement compares the deceleration of the arm with a reference table of scheduled points representing desired velocity at respective positions to selectively control the opening and closing of the bypass valving arrangement during deceleration. During repetitive work or repeat cycles of operation, the reference table is modified in accordance with adaptive procedures to provide accurate control of the deceleration of the arm and the point at which the bypass valve is closed to initiate the deceleration.

25 Claims, 3 Drawing Figures

MANIPULATOR APPARATUS WITH ENERGY EFFICIENT CONTROL

BACKGROUND OF THE INVENTION

A. Field of the Invention

The present invention relates generally to the field of manipulator apparatus and more particularly to an energy efficient control arrangement for manipulator apparatus.

B. Description of the Prior Art

Control arrangements for manipulator apparatus are disclosed for example in U.S. Pat. Nos. 4,362,978, 3,661,051, 4,086,522, 4,132,937, 4,140,953, 4,150,326, 4,163,183, Re. 31,208, and 4,105,937. Typical manipulator apparatus disclosed in these patents is arranged to control the movement of a manipulator arm in a plurality of axes to perform repetitive work cycles in a repeat mode in accordance with stored command signal data for defined program steps; the stored command signal data being acquired in a teach mode. Servo control loops and feedback techniques are utilized to control movement of the manipulator arm in response to the stored command signal data in either a point-to-point mode or a continuous path mode. Servo control valves are utilized in one or more of the axes to provide pressurized fluid from a source to either end of a cylinder to move a piston that is slidably mounted in the cylinder. The pressurized fluid is selectively provided to the cylinder by control of the servo valve. In the point-to-point mode, the servo valve is opened to provide acceleration of the piston until a maximum slew velocity is reached. The servo valve is then controlled to move the piston at the maximum slew velocity until the desired final position is approached whereupon the servo valve is controlled to decelerate the piston with various combinations of position, velocity and acceleration feedback being utilized in the overall control loop.

U.S. Pat. No. 3,744,032 discloses a control arrangement wherein a limp hand mode is established for moving workpiece applications. In the limp hand mode the hydraulic actuators are bypassed when the weld jaws on the manipulator arm engage a moving car body. This allows the car to pull the compliant manipulator arm along the moving path and reduces the number of required recorded points. When the bypass is open at the beginning of a weld to interconnect the ends of the actuator cylinder, the servo valve that normally controls movement of the actuator is disabled.

Other control arrangements provide adaptive control of apparatus wherein stored command data is updated and refined during successive cycles of operation to provide optimized command data. Adaptive systems of this type and other control apparatus are disclosed for example in U.S. Pat. Nos. 3,555,252, 3,917,930, 3,974,432, 3,551,656, 3,757,187, 3,770,947, 3,889,238, 3,825,731, 3,969,723, and 4,021,651.

While the aforementioned control systems are generally suitable for their intended use, it would be desirable to provide energy efficient control of manipulator apparatus wherein the pressurized source is only required for movement of the arm during the acceleration phase; the pressurized source not being connected for supplying the cylinder after the slew velocity is reached.

SUMMARY OF THE INVENTION

Accordingly, it is a principal object of the present invention to provide a control arrangement for manipulator apparatus that conserves energy and that does not require the supply of pressurized fluid from a source to a controlled cylinder except during acceleration of the manipulator arm up to the predetermined slew velocity.

It is another object of the present invention to provide a bypass valving arrangement in manipulator control apparatus that is selectively controlled during slewing of the manipulator arm to interconnect the two ends of an actuating cylinder having a piston slidably mounted therein and that is selectively controlled to achieve appropriate deceleration of the manipulator arm; the manipulator arm during slewing and deceleration being totally controlled by the bypass valving arrangement, a servo valve of the manipulator apparatus being utilized for accelerating the manipulator arm and being either non-operative during slewing and deceleration of the manipulator arm or selectively operable during only a predetermined portion of the deceleration.

It is yet another object of the present invention to provide an energy efficient control arrangement for manipulator apparatus wherein the hydraulic drive system of one or more of the controlled axes provides a pressurized source supply to other of the axes during the deceleration of the one or more axes.

Briefly, these and other objects of the present invention are achieved by providing an energy efficient control arrangement in manipulator apparatus. The control arrangement in a point-to-point mode of operation utilizes a servo valve to selectively admit fluid from a pressurized source to one end of a cylinder. A piston is slidably mounted within the cylinder and connected to move a manipulator arm that is movable in a plurality of axes. The servo valve is closed when a predetermined arm velocity is reached and a bypass valving arrangement is opened to interconnect the ends of the cylinder. At a predetermined position of the manipulator arm, the control arrangement closes the bypass valving arrangement and the manipulator arm is decelerated as the arm approaches the desired final position. The pressurized source includes a fluid reservoir and two low pressure check valves that each connect a respective end of the cylinder with the fluid reservoir when the pressure at the respective end of the cylinder is less than the reservoir pressure. Further, the pressurized source includes an accumulator and two high pressure check valves that each connect a respective end of the cylinder to the accumulator when the pressure at the respective end of the cylinder exceeds the accumulator pressure to supply pressurized fluid to other axes of the manipulator. The control arrangement compares the deceleration of the arm with a reference table of scheduled points representing desired velocity at respective positions to selectively control the opening and closing of the bypass valving arrangement during deceleration. During repetitive work or repeat cycles of operation, the reference table is modified in accordance with adaptive procedures to provide accurate control of the deceleration of the arm and the point at which the bypass valve is closed to initiate the deceleration.

DESCRIPTION OF THE DRAWINGS

These and other objects and advantages of the present invention will become apparent by reference to the following description taken in conjunction with the accompanying drawings wherein.

DETAILED DESCRIPTION OF THE PREFERRED EMBODIMENT

Figure 1:
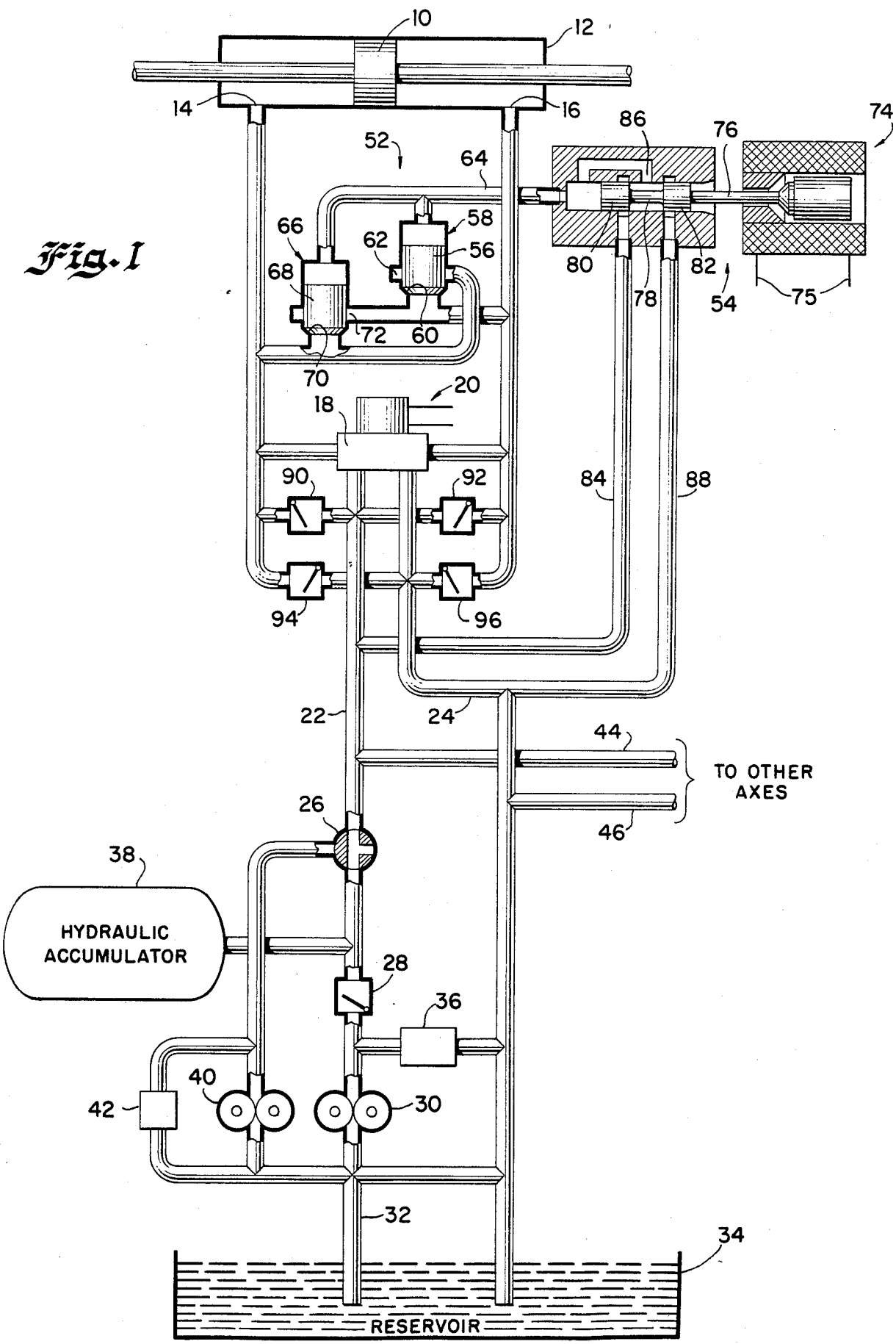
FIG. 1 is a diagrammatic and schematic representation of the energy efficient control arrangement for manipulator apparatus in accordance with the principles of the present invention.

Referring now to FIG. 1, an actuating piston 10 is utilized to control movement of a manipulator arm of a manipulator in one axis of movement; the manipulator being of the general type for example as shown in U.S. Pat. Nos. 3,661,051, 4,086,522, and 4,163,183. The actuating piston 10 is slidably mounted within a cylinder 12. The cylinder 12 includes inlets 14 and 16 at either end of the cylinder for admitting fluid from a pressurized source to either end of the cylinder so as to cause movement of the piston 10 and corresponding movement of the manipulator arm in one axis of a plurality of controllable axes of the manipulator apparatus. Thus, the piston 10 and cylinder 12 are representative of one controlled axis and similar hydraulic acuators are provided for one or more other controlled axes of the manipulator apparatus.

Each of the inlets 14, 16 of the cylinder 12 is connected to a respective output port of a servo valve 18. In accordance with electrical signal inputs at 20, the servo valve 18 controls the flow of pressurized fluid to either of the inlets 14, 16 of the cylinder 10 to drive the piston 10 and thus move the manipulator arm. The servo valve 18 at one input port is connected to a source of pressurized fluid by fluid line 22 and at a second input port is connected to a return line 24.

In the various modes of operation of the manipulator apparatus, the control arrangement of the manipulator apparatus selectively actuates the servo valve 18 to provide the desired movement and control including acceleration, velocity and deceleration to appropriately position the manipulator arm in the axis controlled by the piston 10. For example, when it is desired to move the manipulator arm and piston 10 to the right in FIG. 1, the servo valve 18 is controlled to supply the pressurized fluid from 22 to the inlet 14 of the cylinder 12; the inlet 16 of the cylinder 12 being connected by the servo valve 18 to the return line 24 to allow fluid within the right chamber of the cylinder 12 to flow through the return line 24 as the piston 10 moves to the right.

The pressurized supply line 22 is connected through a teach/repeat mode selection valve 26 and a check valve 28 to the output of a repeat mode pump generally referred to as 30. Reference may be made to application Ser. No. 324,697 filed by T. H. Lindbom on Nov. 25, 1981 for a more complete discussion of the operation of the teach/repeat mode selection valve 26. The input side of the pump 30 is connected via supply line 32 to a reservoir of hydraulic fluid 34. The return line 24 is connected to the reservoir 34. An unloading valve 36 is connected between the output of the pump 30 and the reservoir 34. A hydraulic accumulator 38 is connected in the pressurized supply line 22 downstream of the pump 30 and the check valve 28. For energy saving purposes, a teach mode pump 40 is provided that supplies pressurized fluid to the teach/repeat mode selection valve 26. Thus the smaller capacity teach mode pump 40 is operable for teach requirements where lighter loads and slower movement is desirable. A pressure relief valve 42 is connected between the output of the pump 40 and the reservoir 34. The reservoir 34, the hydraulic accumulator 38 and the hydraulic pumps 30 and 40 are commonly utilized for the manipulator apparatus for all the control axes as exemplified by supply line connection 44 and return line connection 46 to the other axes.

In accordance with important aspects of the present invention, the energy efficient control arrangement of the present invention includes a bypass valving arrangement 52 and a pressure regulator valve 54 that selectively controls the bypass valving arrangement 52. The bypass valving arrangement 52 is arranged to selectively interconnect the two inlets 14, 16 of the cylinder 12.

The inlet 16 is connected in fluid communication with one face of a movable valve element 56 of a first bypass valve 58. The bypass valve 58 includes a valve seat at 60. When the valve 58 is closed the valve element 56 seats against the valve seat 60. The valve 58 also includes a port 62 in fluid communication with the inlet 14 of the cylinder 12. The opposed face of the movable valve element 56 is in fluid communication with the output of the pressure control valve 54 via a fluid control line 64. The bypass valving arrangement 52 includes a second bypass valve 66. The second bypass valve 66 includes a movable valve element 68 having one valve face in fluid communication with the control line 64 from the valve 54 and an opposed valve face in fluid communication with the inlet 14 of the cylinder 12. The bypass valve 66 similarly includes a valve seat 70 at the valve end connected to the inlet 14. Further the bypass valve 66 also includes a fluid port 72 in communication with the inlet 16 of the cylinder 12.

When the control valve 54 supplies pressurized fluid at 64 of sufficient pressure, the valve elements 56 and 68 are moved to the respective valve seats 60, 70 to close the bypass valves 56, 68 so that the inlets 14, 16 are not in communication. When the pressure in the control line 64 is lower than the pressure at either inlet 14 or 16, the bypass valves 58, 66 are opened and the inlets 14, 16 are interconnected in fluid communication. In specific arrangements, the area of the valve faces of the valve elements 56, 68 adjacent line 64 are larger than the area of the valve faces interconnected to the inlets 14, 16. In a specific embodiment, the pressure control valve 54 and the bypass valving arrangement 52 are implemented by one half of a model RE 29378, type 4WRZ 10 proportional valve available from REXROTH.

The pressure control valve 54 includes a solenoid 74 that is controlled over electrical connections at 75 to selectively position an extending solenoid actuator 76. The solenoid actuator 76 is connected to a valve spool 78 of the valve 54. The valve spool 78 includes disposed thereon valve elements 80 and 82. The valve element 80 selectively provides fluid communication between a supply input 84 connected to the supply line 22 and an output port 86 connected to the control output 64. Further the valve spool 78 also includes a valve element 82 that selectively connects a return port 88 to the output port 86 in communication with the control line 64. The return port 88 is connected via the return line 24 to the reservoir 34.

Thus, when solenoid actuator 76 is positioned to the left position in FIG. 1, the pressurized supply line 22 is in fluid communication with the control line 64 to maintain the bypass valves 58, 66 in a closed position. Further, when the solenoid actuator 76 is shifted to the right of the position in FIG. 1, the supply line 84 is closed off and the return line 88 is in fluid communication with the control line 64 to allow the bypass valves 58, 66 to open in response to pressure in either of the inlets 14, 16 of the cylinder 12.

Further it should also be understood that the control valve 54 is operable in a pressure regulator mode wherein the position of the solenoid actuator 76 corresponds to proportional pressure at the supply line 64 for selective opening and closing of the bypass valves 58, 66 in accordance with the pressure in the inlets 14, 16 of the cylinder 12.

The control arrangement of the present invention further includes a high pressure check valve 90 connected between the inlet 14 and the pressurized supply line 22; the check valve 90 being arranged to open when a predetermined differential pressure is exceeded at the inlet 14 with respect to the pressure of the source 22. Similarly a high pressure check valve 92 is provided between the inlet 16 and the pressurized supply line 22; the check valve 92 being arranged to open when a predetermined differential pressure is exceeded at the inlet 16 with respect to the pressurized source at 22. Further a low pressure check valve 94 is connected between the return line 24 and the inlet 14 so that the check valve 94 opens when the pressure in return line 24 exceeds the pressure at inlet 14. Similarly a low pressure check valve 96 is provided between the return line 24 and the inlet 16.

Considering now the operation of the manipulator apparatus and control arrangement of the present invention, a desired work cycle of operation for the manipulator apparatus is taught in the teach phase as the manipulator arm is moved to various positions to define an overall work cycle. During the teach phase, data representing positions of the manipulator arms in the plurality of controllable axes is recorded as a series of program steps representing the positions to which the manipulator arm is to be moved during a subsequent repeat of the work cycle.

In the repeat mode, the manipulator arm is controlled to execute the work cycle in accordance with the read out of the stored data recorded during the teach phase. The control arrangement of the present invention is selectively controlled to utilize the servo valve 18 for acceleration of the arm in the respective axis as the manipulator arm moves for example from a point P1 toward a point P2. Further after the acceleration of the manipulator arm to a slewing velocity in the respective axis, the servo valve 18 is disabled and the bypass valving arrangement 52 is operative to interconnect the inlets 14, 16 of the cylinder 12 for control of the arm while the arm is slewing. When the arm approaches a predetermined distance from the desired final destination point P2, for example, the bypass valving arrangement 52 is closed under the control of the control valve 54 and the manipulator arm is decelerated in accordance with the increased pressure at one of the inlets to the cylinder 12.

For example if the piston actuator 10 is moving to the right in FIG. 1 with the bypass valving arrangement 52 closed and with the servo valve 18 disabled, the pressure increases at the inlet 16 of the cylinder 12. When the pressure at inlet 16 increases above the pressure in the supply line 22, the check valve 92 opens and pressurized fluid is provided to the accumulator 38. With pressurized fluid being delivered to the accumulator 38 at a pressure in excess of the pressure developed by the pump 30 and above the pressure of the check valve 28, the load on the pump 30 is removed and the pressurized fluid from 16 becomes a source of pressure to the system and the other manipulator axes by means of the hydraulic accumulator 38 and the lines 44, 46.

It should be remembered that the cylinder 12 and valving arrangement 52 are representative of one controlled axis of the manipulator. Thus acceleration, slewing and deceleration in accordance with the particular move also occurs in the other controllable axes; acceleration possibly being required for one axis while another axis is slewing. Thus, as pressurized fluid is supplied to the accumulator 38 via the inlet 16 at one axis, pressurized fluid may also be utilized to control other axes of the manipulator for example as shown at 44 without the need for operation or load on the pump 30. Accordingly, energy efficiency is achieved and deceleration control is provided without the use of the servo valve 18 or the pump 30.

Considering again the deceleration of the manipulator arm with the servo valve 18 disabled and the bypass valving arrangement 52 closed, the control arrangement compares the deceleration of the manipulator arm in each of the axes with a desired deceleration schedule to properly position the arm in the respective axis to achieve the desired point P2. The control arrangement selectively operates the control valve 54 and thus the valving arrangement 52 to appropriately maintain the deceleration schedule for final positioning of the arm at the desired point P2.

Similarly, the next program step, for example a move from P2 to P3, is then implemented in a similar fashion and with similar selective control of the bypass valving arrangement 52 via the control valve 54.

The desired deceleration schedule can be obtained in either the teach phase or the repeat phase in accordance with various specific embodiments. For embodiments that generate the data during the teach phase, the deceleration schedule is obtained from taught move position data and predetermined manipulator arm parameters. For the embodiments where the schedule data is generated during the repeat phase, the data is derived from one or more of the velocity, position, and acceleration parameters of the manipulator arm.

Considering now one specific embodiment of the control arrangement, the various types of moves to be performed by the manipulator arm in the various program steps are defined by categories in accordance with the distance $S_f$ for a particular program step for example as defined by the distance between two manipulator arm positions P2−P1. While manipulator arm positions such as P2 and P1 and distance of $S_f$ are discussed, it should be realized that the appropriate distance measurements for each particular controlled axis are defined in term of the positional change as measured in each respective axis resulting in a composite manipulator arm movement such as $S_f$=P2−P1.

In one specific implementation, various moves are defined by one of three categories. For a first short move category I as defined by P2−P1, the servo valve 18 is arranged to control the overall movement of the move for the program step. The short category I move is defined in terms of the arm parameters as follows: if a is the predetermined distance for the manipulator arm in a particular axis to accelerate to slew speed under the control of the servo valve 18, the category I short move is defined when the distance of the move $S_f$ is less than 2a but greater than a constant K1.

A second category II medium length move is defined when the distance of the move $S_f$ is less than 2a but greater than the constant K1. A third category III long move is defined when the distance of the move $S_f$ is greater than 2a.

Considering the category II medium length move, the servo valve 18 is closed or disabled at a point S1 equal to $\frac{1}{2} S_f$ and the bypass valving arrangement 52 remains closed until the control arrangement determines that opening of the valving arrangement is required in accordance with a comparison of manipulator arm movement with the deceleration schedule.

Concerning the Category III long move, the servo valve 18 is closed or disabled and the bypass valving arrangement 52 is opened when $S_1 = a$.

Figure 2:
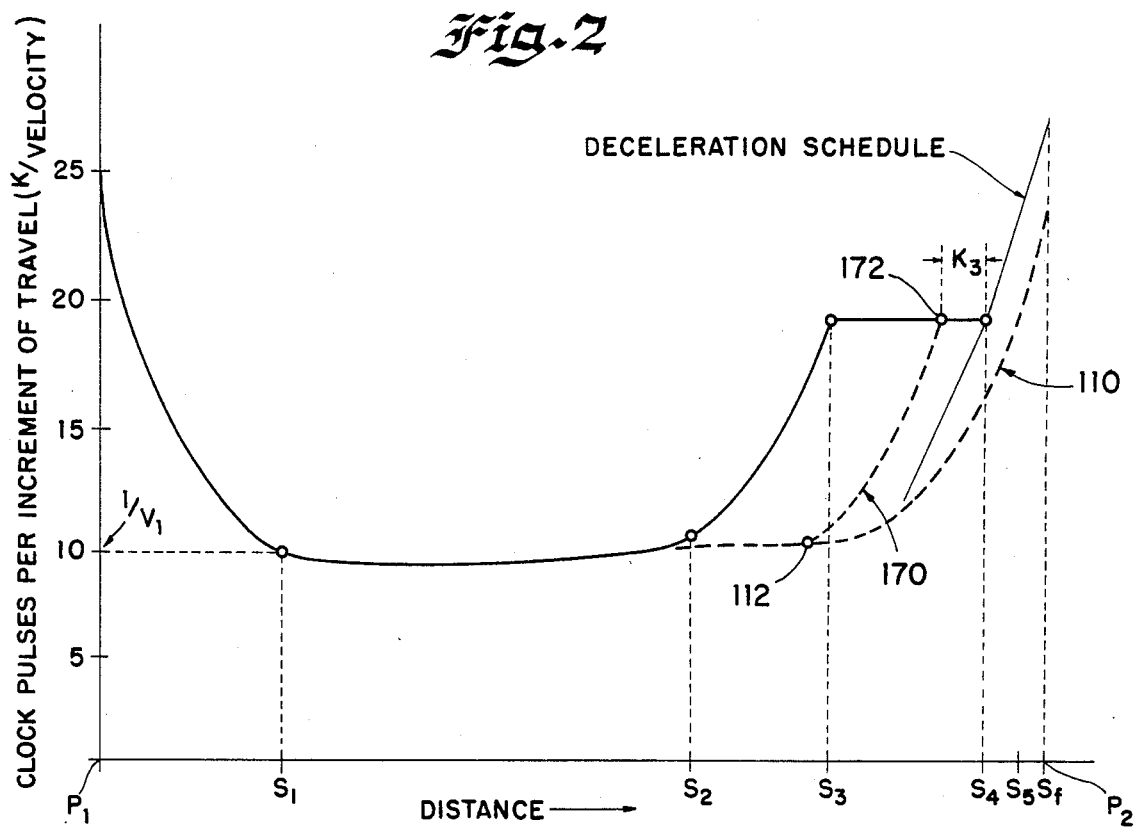
FIG. 2 is a graphical representation of the operation of the control arrangement of FIG. 1 to control manipulator apparatus.

Referring now to FIG. 2, the long move category III is illustrated as an inverse velocity vs. distance plot. For simplicity, the abscissa is referenced to a zero distance reference such that the starting point of the move from P1 to P2 is referenced to P1=0. Thus for a III category move, the servo valve 18 closes and the bypass valving arrangement 52 is opened when $S_1 = a$ which occurs after the manipulator arm in the depicted axis has accelerated to a slew speed for example as depicted in FIG. 2 as the inverse velocity value $1/V_1$. With the servo valve 18 disabled and the bypass valving arrangement 52 opened, the inlets 14, 16 of the cylinder 12 are interconnected and the arm slews from position $S_1$ to position $S_2$. During this slewing movement, as the actuator 10 moves to the right in FIG. 1, fluid is forced out at the inlet 16 at the right end of the cylinder 12 and passes through the bypass valving arrangement 52 to the inlet 14.

In accordance with one specific implementation of the control arrangement, the bypass valving arrangement 52 is closed at a point $S_2$ equal to $S_f - K2\, S_1$, where K2 is a coefficient less than 1. This is the point as determined by the control arrangement where acceleration is to begin to appropriately decelerate the arm and stop at the final position $S_f$. After the bypass valving arrangement 52 is closed and the arm decelerates for example from the point $S_2$ to $S_3$, the control arrangement compares the velocity of the manipulator arm in the depicted axis to the desired deceleration schedule. Whenever the velocity of the manipulator arm falls below the scheduled deceleration curve, the control arrangement opens the bypass valving arrangement 52 via the control valve 54 for example at $S_3$ and the arm slews between $S_3$ and $S_4$. At $S_4$ the control arrangement determines that the manipulator arm velocity is now greater than the scheduled velocity and the bypass valving arrangement 52 is again closed such that the manipulator arm decelerates between $S_4$ and $S_f$, the final position.

For reference purposes, the dashsed curve 110 from $S_2$ to $S_f$ represents a theoretical ideal deceleration schedule of the manipulator arm such that the arm slews for the maximum distance towards $S_f$ and decelerates with appropriate control of the bypass valving arrangement 52 within the shortest distance to arrive at the position $S_f$.

Considering subsequent cycles of operation, the control arrangement in accordance with adaptive control procedures modifies the position at which the bypass valving arrangement 52 is first closed after the arm slews. For example, in one implementation, the point S3 is utilized for adaptive control modifications of the control cycle as defined by the position at which the bypass valve valving arrangement 52 is first opened after closure at $S_2$; the point $S_3$ being determined as the first scheduled point where the velocity of the arm falls below the desired deceleration schedule. In accordance with one adaptive control procedure, the point at which the bypass valving arrangement 52 is closed is modified from the position $S_2$ to a position defined by the expression $P(S_4 - S_3 - K3)$, where P is a coefficient for the rate of correction that is less than one, and K3 is a residue chosen large enough to absorb small variations from cycle to cycle and to enable the adaptive correction procedure to be reversible. Thus, during the next subsequent repeat cycle, instead of the bypass valving arrangement 52 being closed at $S_2$, the bypass valving arrangement in accordance with the adaptive procedure will be first closed at a point designated at 112 in FIG. 2 equal to $S_2 + P(S_4 - S_3 - K3)$.

Considering the various embodiments of the control arrangement of the present invention and the method of operation, the selective control of the bypass valving arrangement 52 for appropriate deceleration control in comparison with a deceleration schedule may be provided in a number of different manners.

For example, in one arrangement, teach assist apparatus for example as shown in U.S. Pat. Nos. 4,086,522 and 4,163,183 may be utilized during the teach phase to derive an appropriate deceleration schedule or table of values at predetermined intervals for each move for which the bypass valving arrangement 52 and the control valve 54 are operable, for example category II and III moves. Thus, the position at which the servo valve 18 is disabled or closed and the point at which the bypass valving arrangement 52 is closed to start deceleration is calculated during the teach phase and stored in the control arrangement for use by the control arrangement during the repeat cycles. Further in this arrangement, the recorded data can be addressed and read out of the control arrangement for use in the control of the manipulator arm in accordance with the position of the manipulator arm in each of the axes. The data recorded in the control arrangement may be addressed either entirely by the position encoders of the manipulator apparatus or by the lower significant digit positions of the encoder apparatus in conjunction with data read out of the main program memory with the higher significant address digits being provided as an address from the main program memory.

In another specific embodiment, the control arrangement operates totally on line and independent of the data recorded in the program step memory in the teach phase. Thus, the control arrangement determines for each move or program step the appropriate control of the servo valve and bypass valving arrangement and deceleration schedule in accordance with the manipulator arm parameters by monitoring velocity parameters and by obtaining the distance P2−P1 for each particular move.

Further while a control arrangement has been discussed with selective on/off control of the bypass valving arrangement 52 by the control valve 54, proportional control of the bypass valving arrangement 52 is also contemplated in an alternate embodiment wherein the solenoid 74 via signal 75 is positioned to provide a proportionately controlled pressure to the bypass valving arrangements 52 so that the opening and closing of the bypass valves 52 is determined by the differential pressure appearing across each valve arrangement 56, 68 for a higher degree of control. Additionally, the control valve 54 in one embodiment is operated in a closed loop fashion with the velocity of the manipulator arm being compared to the schedule deceleration and the error therebetween being utilized as a closed loop error signal to appropriately control the solenoid 74 via the signals 75.

Figure 3:
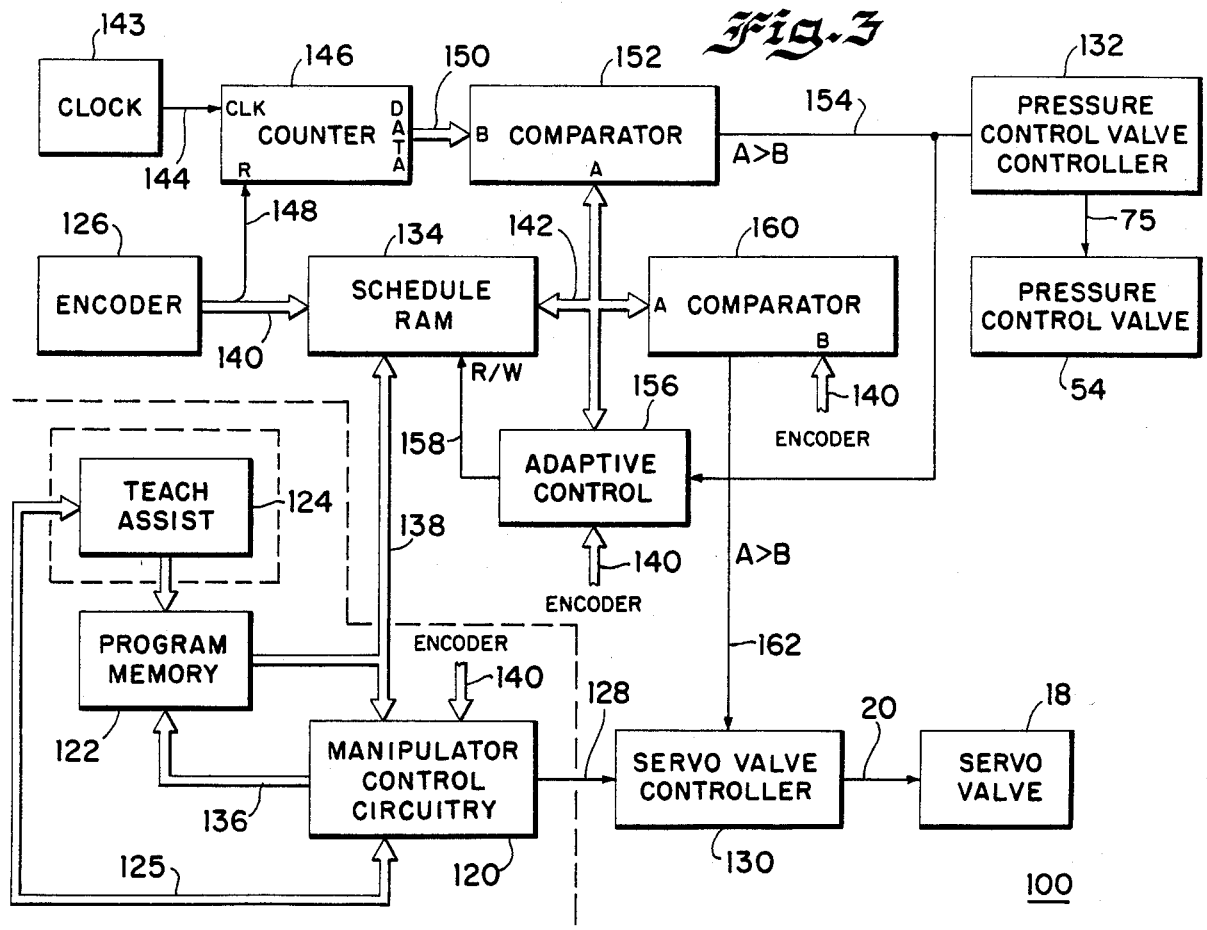
FIG. 3 is a block diagram and schematic representation of one form of the control arrangement of the present invention for use in conjunction with the apparatus of FIG. 1.

Considering now one specific embodiment of the control arrangement of the present invention wherein schedule data is generated during the teach phase and referring now to FIG. 3, the control arrangement 100 includes manipulator control circuitry 120, a main program memory 122, teach assist apparatus 124, and position encoder apparatus 126 all as generally described in U.S. Pat. Nos. 3,661,051 and 4,163,183. The manipulator control circuitry 120 and the teach curcuit apparatus 124 communicate over a databus 125.

The manipulator control circuitry 120 provides control outputs 128 that are provided to a servo valve controller circuit 130 which in turn controls operation of the servo valve 18. The control signals 128 of the manipulator control circuitry 120 are operative to entirely control the servo valve controller 130 and servo valve 18 for continuous path operation and various other modes. Further the servo valve controller 130 controls the servo valve 18 for point to point moves for Category I type moves and during acceleration of the arm for Category type II and III moves.

The pressure control valve 54 for the bypass valving arrangement 52 is controlled over signal lines 75 by a pressure control valve controller stage 132. A schedule RAM memory circuit 134 includes stored therein a deceleration schedule or table for each of the moves to be controlled by the control arrangement and also includes data for each program step representing the position $S_1$ at which the servo valve 18 is closed or disabled and the point $S_2$ at which the bypass valve is closed.

It will be remembered that for Category II moves, the servo valve is closed or disabled at point $S_1$ and the bypass valving arrangement 52 remains closed to immediately begin deceleration of the arm with the bypass valving arrangement being opened only when the velocity of the arm drops below the deceleration schedule.

During operation of the manipulator apparatus, the manipulator control circuitry 120 over control lines 136 controls the program memory 122 to output program data on data bus 138. The data on the bus 138 represents the position of the arm in each of the plurality of controlled axes for each program step of the work cycle. for example, with the manipulator arm positioned to position P1, the manipulator control circuitry 120 conditions the program memory 122 to output the positional data for program step position P2 on the data bus 138. The data bus 138 is connected as an address signal to the schedule RAM 134 and is also connected to the manipulator control circuitry 120. The manipulator control circuitry 120 includes servo loop control circuitry including a comparator and a digital to analog converter for outputting an error signal at 128 to drive the servo valve controller 130.

The encoder stage 126 represents the absolute positional encoders for each of the controlled axes and provides absolute arm position data in each of the controlled axes on a data bus 140. The encoder data bus 140 is connected as an address input to the schedule ram 134 and is also connected as an input to the comparator of the manipulator control circuitry 120.

The schedule RAM 134 utilizes the program step position data on the program memory data bus 138 for a high address signal at high address bits and further utilizes the encoder data bus 140 as a low address signal on one or more lines for low address bits. Thus, in combination, the address data on buses 138 and 140 appropriately address the desired deceleration schedule data of the sechdule RAM 134. The deceleration schedule data that is addressed is outputted by the schedule RAM 134 on a data output 142.

The control arrangement 100 of FIG. 3 measures the inverse velocity of the manipulator arm in the respective axis as a number of clock pulses of predetermined period that occur between successive bit changes in the digital encoder data at 140; for example $1/v = CP/\#LSD$, with the increment of arm movement being selected for example as one of the digital data bits of the encoder data at 140. For example, one form of the encoder includes a digital output of 10 to 14 bits, and in a specific embodiment, the least significant digit of the encoder data at 140 is utilized as the increment of travel. In other embodiments, the second or third most least significant digit is utilized as the increment of travel.

Secpifically, considering the control arrangement 100 in FIG. 3, a clock stage 143 operates to produce clock pulses of a predetermined period at output 144; the predetermined period being chosen such that a suitable number of clock pulses occur for accurate measurement of the velocity of the manipulator arm during each increment of travel of the manipulator arm for the defined ranges of manipulator arm velocity of interest. The clock output 144 is connected to the clock input of a counter stage 146. The reset input of the counter stage 146 is controlled by the least significant digit of the encoder data at 140 on signal line 148.

Thus, the counter stage 146 counts the clock pulses at 144 that occur during the interval between successive resets at 148 representing an increment of travel of the manipulator arm in the particular axis illustrated in FIG. 3. The data output 150 of the counter 146 thus represents the accumulated clock pulse count for each increment of travel. Accordingly, the output at 150 represents the inverse of manipulator arm velocity in the particular axis.

The inverse velocity signal 150 is connected to a first B input of a comparator 152. A second A input of the comparator 152 is connected to the deceleration schedule data bus 142 from the schedule RAM 134. The comparator 152 is a digital comparator that compares the digital signal at the A and B inputs and provides an output at 154 that represents the results of the comparison between the data on 142 and 150. The comparator output 154 is connected as a control input to the pressure control valve controller stage 132. The comparator output 154 is also connected as a control input to an adaptive control stage 156. The adaptive control stage 156 also includes the encoder data bus 140 and the acceleration schedule data 142 as inputs. The adaptive control stage 156 includes a read/write control output 158.

The deceleration schedule data 142 of the schedule RAM 134 is also connected to a first A input of a comparator 160. The comparator 160 includes a second B input that is connected to the encoder databus 140. The output 162 of the comparator 160 provides a control inhibit input to the servo valve controller 130. Thus, when the inhibit input 162 is active, the servo valve control 130 is disabled so as to maintain the servo valve 18 closed.

The comparator 152 is arranged to output a bypass valve closed control signal at 154 whenever the A input from the schedule RAM data 142 is greater than or equal to the B input, the inverse velocity signal at 150. Further, the comparator stage 152 provides an open valve control signal at 154 whenever the A input is less than the B input. The comparator 160 is arranged to output a servo valve enable signal at 162 to allow operation of the servo valve controller 130 by the input 128 whenever the A input form the schedule RAM data 142 is greater than the encoder data input B. Further the comparator 160 is arranged to output a servo valve inhibit closed signal at 162 to maintain the servo valve 18 disabled to the closed position whenever the encoder data input at B is greater than or equal to the schedule RAM data at input A.

Considering now the operation of the control arrangement 100 of FIG. 3, Table 1 represents the deceleration schedule data written into the schedule RAM 134 for a Category III move and Table 2 represents the deceleration data schedule written into the schedule RAM 134 for a Category II type move.

TABLE 1

| CATEGORY III MOVE | | | |
|---|---|---|---|
| ADDRESS | | DATA 1 | DATA 2 |
| HI | LO | (CP/#LSD) | (SERVO CLOSE) |
| STEP 1(P1-P2) | 0 | HI | $S_1$ or HI |
| STEP 1(P1-P2) | $S_1$ | LO or 5 | $S_1$ or LO |
| STEP 1(P1-P2) | $S_2$ | HI or 20 | $S_1$ or LO |
| STEP 1(P1-P2) | $S_3$ | 18 | $S_1$ or LO |
| STEP 1(P1-P2) | $S_4$ | 22 | $S_1$ or LO |
| STEP 1(P1-P2) | $S_5$ | 25 | $S_1$ or LO |
| STEP 1(P1-P2) | $S_f$ | HI | $S_1$ or LO |

TABLE 2

| CATEGORY II MOVE | | | |
|---|---|---|---|
| ADDRESS | | DATA 1 | DATA 2 |
| HI | LO | (CP/#LSD) | (SERVO CLOSE) |
| STEP 1(P1-P2) | 0 | HI | $S_1$ or HI |
| STEP 1(P1-P2) | $S_1$ | HI or 20 | $S_1$ or LO |
| STEP 1(P1-P2) | $S_a$ | 15 | $S_1$ or LO |
| STEP 1(P1-P2) | $S_b$ | 20 | $S_1$ or LO |
| STEP 1(P1-P2) | $S_c$ | 22 | $S_1$ or LO |
| STEP 1(P1-P2) | $S_e$ | 25 | $S_1$ or LO |
| STEP 1(P1-P2) | $S_f$ | HI | $S_1$ or LO |

The deceleration schedule in Table 1 for a Category III move corresponds to the graphic representation in FIG. 2 of a typical move where $S_f$ is greater than $2a$. The schedule RAM 134 as shown in Table 1 includes the high address signal from the program memory data bus 138 and a low address signal from the encoder data bus 140. The Data 1 and Data 2 columns represent the data in the schedule RAM 134 at the corresponding addresses; the binary range of the Data 1 and Data 2 entries ranging from a predetermined high digital number HI to a predetermined low LO digital number. The Data 1 column represents a number of clock pulses per increment of travel or number of LSD's which as discussed hereinbefore corresponds to an inverse velocity signal. The Data 2 column represents servo control data and is defined in terms of a digital number corresponding to manipulator arm position and scaled to correspond to the encoder data at 140.

Considering first a category III move and referring to the data in Table 1 and the graphic representation in FIG. 2, consider a program step identified as step 1 for a move between the points P1 to P2 with the encoder data at 140 referenced for discussion purposes to a reference value of zero. The RAM 134 at 142 outputs Data 1 equal to the high data HI and Data 2 equal to $S_1$ or a high data number HI. The comparator 152 in response to the Data 1 HI value provides a valve closed control signal at 154 to the pressure control valve controller stage 132. Accordingly, the bypass valving arrangement 152 is maintained in the closed position as the servo valve controller stage 130 controls the servo valve 18 to accelerate the manipulator arm from the zero reference position at P1 toward the position $S_1$.

Further between the points P1 and $S_1$ of manipulator arm movement in the illustrated axis, a Data 2 output from the schedule RAM 134 at 142 equal to $S_1$ or HI is output to the comparator 160. Accordingly, since the manipulator arm position represented at bus 140 is less than $S_1$, the B input is less than the A input and the servo enable signal at 162 is applied to the servo valve controller 130 such that normal servo valve operation continues by the manipulator control circuitry 120.

When the manipulator arm position reaches position S1 as determined by the encoder data 140, the schedule RAM 134 in accordance with the address $S_1$ outputs Data 1 equal to a HI or 20 and Data 2 equal to $S_1$ or LO. Since the inverse velocity signal at 150 to the B input of the comparator 152 will be in the approximate range of 10 CP/#LSD, the A input will be less than the B input and the bypass valving arrangement open signal will be outputted at 154 by the comparator 152. Thus, the bypass valving arrangement 52 will be opened. At the same time, the Data 2 output of $S_1$ or a LO will be input to the A input of the comparator 160 and the B input from the encoder data 140 will be equal to $S_1$. Since the A input is less than or equal to the B input, the servo valve disable or close signal at 162 will be output to the servo valve controller 130 and the servo valve 18 will be closed. Accordingly, the manipulator arm in the illustrated axis slews at the attained arm velocity toward the point $S_2$.

As the manipulator arm moves from position $S_1$ through positions $S_2$, $S_3$, $S_4$ and $S_5$ to the final position $S_f$ at P2, the Data 2 output remains a LO or $S_1$ at each of the corresponding address locations. Thus, the servo disable signal at 162 will be maintained throughout the remainder of the move to maintain the servo valve 18 in the closed position until the next program step position is output at 138 to the schedule RAM 134.

Considering the Data 1 for the bypass valving arrangement schedule, when the position $S_2$ is reached by the manipulator arm, a HI or 20 will be input to the comparator at the A input while the B input of inverse velocity will be approximately 10. Since the A input is greater than the B input, the bypass close signal at 154 is provided to the pressure control valve controller 132 and the bypass valving arrangement 52 will be closed. Accordingly, the arm decelerates in accordance with the system behavior and the arm moves from position $S_2$ toward position $S_3$.

For the remainder of the schedule table of Table 1, the schedule RAM 134 outputs the illustrated data at the points $S_3$, $S_4$, $S_5$ and $S_f$ and the bypass valving arrangement 52 is appropriately controlled in accordance with the A and B inputs to the comparator 152. For example, when the arm reaches the position $S_3$, the A input receives a data value of 18. The B input to the comparator 152 will either be above or below the A input dependent upon the arm deceleration. Referring to FIG. 2, if the arm is slowed to an inverse velocity number of 20, below the scheduled deceleration of 18, the A input is less than the B input and the bypass valving arrangement 52 will be opened and the arm will move as indicated in FIG. 2 from $S_3$ toward $S_4$. If on the otherhand the inverse velocity signal 150 to input B indicates that the manipulator arm was moving at a more rapid rate than the inverse velocity number of 18, such as 15 or 16, the A input would be greater than the B input and the bypass valving arrangement 52 will remain closed to further decelerate the arm. As the arm moves past $S_3$ and toward $S_4$, when the inverse velocity signal indicates that the manipulator arm velocity is slowed to a value of 18 or above, the bypass valving arrangement 52 would be opened at that time.

Considering again the illustration of FIG. 2, as the point $S_4$ is reached, the Data 1 to the comparator 152 at the input is equal to 22 for the deceleration schedule and as shown in FIG. 2 the manipulator arm inverse velocity signal is approximately 18 to 20. Thus, the A input is greater than the B input and the bypass valving arrangement 52 will be closed to further decelerate the arm since the manipulator arm velocity at $S_4$ exceeded the velocity as represented by the schedule data.

The comparison between the inverse velocity signal and the schedule data from the schedule RAM 134 continues throughout the move until the arm approaches the final position $S_f$ at P2. At this address, the acceleration schedule at 142 is a HI value such that the bypass valving arrangement 52 is closed.

It should be understood that the values in the schedule Tables 1 and 2 are merely illustrative and do not necessarily depict the actual scheduled points; the scheduled values merely illustrating a number of exemplary data points to illustrate the operation of the invention. Thus, it should be understood that more points may be scheduled between positions $S_2$ and $S_3$ and between $S_3$ and $S_4$ for appropriate control.

Considering Table 2 for a Category II move, the illustrated data is applicable to a move for example where $S_f = 2a$. The schedule RAM data 134 at the appropriate positions will enable the servo valve from P1 to S1 and maintain the servo valve 18 closed after position S1 is reached and throughout the remainder of the move to P2. Further for a Category 2 move, the bypass valving arrangement 52 remains closed at position $S_1$ for deceleration of the arm. The bypass valving arrangement 52 is opened only when the inverse velocity signal at 150 is equal to or exceeds the schedule data which corresponds to the arm velocity being slower than the appropriate schedule deceleration.

As discussed hereinbefore, the adaptive control stage 156 operates in accordance with an adaptive control function as discussed hereinbefore to modify the deceleration data value in the schedule RAM 134 during successive cycles of operation to provide more accurate control of the deceleration of the arm from $S_2$ to $S_f$ to approach the theoretical ideal acceleration curve 110 of FIG. 2.

For example the data at the $S_2$ and $S_3$ address locations would be modified from the first to second cycles so that the data entry at $S_2$ for Data 1 would be rewritten by the adaptive control stage 156 to provide a data value of 9 or 10, for example, such that the bypass valving arrangement 52 would remain open until the point $S_3$ is reached. Further, the adaptive control stage 156 is operative to rewrite the data at address location $S_3$ to a data value of approximately 18. Thus, the bypass valving arrangement 52 would be closed at $S_3$ as shown by the dashed curve 170 in FIG. 2. Further, the data at address location $S_4$ would be rewritten to a value of approximately 20. Accordingly, with a value of 18 at address location $S_3$, the bypass valving arrangement 52 would remain closed until the inverse velocity signal 150 is equal to or exceeds 18 whereupon the bypass valving arrangement 52 would be opened as indicated at 172 in FIG. 2. Further as the arm moved from position 172 to $S_4$ with the bypass valving arrangement 52 opened, the bypass valving arrangement 52 would be closed at $S_4$ if the inverse velocity at 150 as shown in FIG. 2 were less than 20.

Considering Category I program steps, appropriate address locations can be provided in the schedule RAM 134 with data representing a closed condition of the bypass valving arrangement 52 and enabling of the servo valve 18 for the entire move.

Alternatively, independent address control bit positions are provided in the program memory 122 and address bits are recorded in the program memory for each program step for control by the control arrangement 100. Further, these control bit positions include common address data for all program steps that do not utilize the control arrangement with the common address either not addressing a memory location of the schedule RAM or the memory location at the common address including schedule data for continued servo valve enablement and continued bypass valve closure.

The control arrangement 100 of FIG. 3 illustrates common portions of the manipulator apparatus control and the specific control stages to control one axis of the manipulator in accordance with the present invention. Thus, the teach assist stage 124, the program memory 122 and the manipulator control circuitry 120 are common to the control arrangement for all the controlled axes and a control arrangement substantially identical to control arrangement 100 of FIG. 3 is provided for each of the controlled axes. Thus, a schedule RAM stage 134 is provided for each of the axes with appropriate schedule data.

Alternatively, the control arrangement 100 of FIG. 3 may be modified so that portions of the control arrangement may be utilized for all the controlled axes. For example, a single schedule RAM 134, adaptive control 156, clock 142, and comparators 152, 160 can be arranged to operate on a multiplex basis for all the controlled axes. Of course, separate counter stages 146, pressure control valves 54, bypass valving arrangements 52, and servo valves 18 are provided for each of the controlled axes.

Considering other specific embodiments of the control arrangement of FIG. 3, the schedule data for the control of the servo valve is recorded in the program memory 122 and output directly to the servo valve controller stage 130. Further, in another specific embodiment, the data of the DATA 1 column for the control of the bypass valving arrangement is also recorded in the program memory 122 at additional data locations and addressed by the encoder data bus 140 in addition to the manipulator control circuitry 120. Further in another specific embodiment, the DATA 2 schedule data for the servo valve enable/disable is read out once for the schedule RAM at the beginning of each program step and the data is latched in the comparator stage 160 for use throughout the program step and reset at the end of each program step.

In other specific embodiments of the control arrangement 100, a microprocessor is utilized to determine the appropriate deceleration schedule and servo valve closure point for each program step. Thus, in that specific embodiment, the deceleration schedule open point of the bypass valving arrangement 52 and the closure point of the servo valve 18 do not have to be calculated during the teach phase or recorded in a schedule RAM 134. The microprocessor obtains an appropriate deceleration schedule from the acceleration phase of the manipulator arm during the current program step movement and utilizes this schedule either directly or with adaptive control modification to control the deceleration. Further, the microprocessor for a category III move determines the point for servo closure and bypass valving arrangement opening by monitoring the velocity of the manipulator arm and determining the point at which acceleration ceases and arm slewing velocity is attained.

It should also be realized that in other specific embodiments, the velocity of the manipulator arm is obtained by methods other than counting clock pulses per increment of encoder change including velocity transducers or by calculating velocity directly from the encoder data rate charge.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator, the combination of, a manipulator arm movable in a plurality of axes, a piston slidably mounted within a cylinder and connected to said arm, servo valve means for admitting fluid from a pressurized source to either end of said cylinder to move said arm in either direction along a first of said axes, normally closed bypass valve means interconnecting the ends of said cylinder, said bypass valve means having a sufficiently large area that substantially no braking effect is exerted thereby when said bypass valve means is fully open, means for developing a command signal corresponding to a desired movement of said arm from a first point to a second point along said first axis, means responsive to said command signal for opening said servo valve means so that said arm is accelerated towards said second point, means operative when the velocity of said arm reaches a predetermined value for closing said servo valve means and opening said bypass valve means so that said arm moves towards said second point without requiring additional energy from said pressurized source, and means for closing said bypass valve means after said arm has moved to a predetermined position so that said arm is thereafter decelerated to substantially zero velocity at said second point.

2. The combination of claim 1, wherein said pressurized source includes an accumulator and high pressure check valve means for interconnecting said cylinder and said accumulator when the pressure in said cylinder exceeds the pressure in said accumulator as said arm is decelerated.

3. The combination of claim 2, wherein said pressurized source includes a fluid reservoir and low pressure check valve means for interconnecting the other end of said cylinder and said reservoir when said arm is decelerated.

4. The combination of claim 1, which includes means for recording at periodic intervals the velocity of movement of said arm in said first axis during acceleration of said arm to said predetermined value of velocity, thereby to provide a recorded velocity schedule.

5. The combination of claim 1, which includes position encoder means for developing a position encoder signal corresponding to the position of said arm along said first axis, means responsive to said position encoder signal for developing an output signal representing the velocity of said arm along said first axis, and means for recording said output signal at closely spaced intervals during the period when said arm is accelerated toward said predetermined value of velocity.

6. The combination of claim 4, which includes comparator means for comparing said recorded velocity of said arm with the actual velocity of said arm as it is decelerated and developing a control signal when said actual velocity falls below said recorded velocity by a predetermined amount, and means responsive to said control signal for again opening said bypass valve means so that said arm decelerates in accordance with said recorded velocity schedule.

7. The combination of claim 6, which includes means for again closing said bypass valve means when the actual velocity of said arm becomes substantially equal to said recorded velocity at a particular point.

8. The combination of claims 2 or 3, wherein said piston is arranged to control movement of said manipulator arm in said first axis and which further includes hydraulically operated actuator means for controlling movement of said manipulator arm in at least a second of said plurality of axes, said hydraulically operated actuator means being connected to said pressurized source.

9. The combination of claim 8 wherein said pressurized source comprises a hydraulic pump and second high pressure check valve means connected in line between said pump and said accumulator, said hydraulically operated actuator means being supplied with pressurized fluid through said high pressure check valve means that interconnects said cylinder and said accumulator when said piston is decelerated upon the closing of said bypass valve means.

10. The combination of claim 1, which further includes schedule storage means having stored therein arm movement parameters representing desired deceleration characteristic of said manipulator arm in said first axis at corresponding positions of said manipulator in said first axis between said first and second points, and bypass valve control means responsive to said schedule storage means for opening said bypass valve means when said manipulator arm deceleration in said first axis exceeds said desired deceleration characteristics and for closing said bypass valve means when said manipulator arm deceleration is less than said desired deceleration characteristics.

11. The combination of claim 10 which further includes a second piston slidably mounted within a second cylinder and connected to said arm, second servo valve means for admitting fluid from said pressurized source to either end of said second cylinder to move said arm in either direction along a second of said axes, second normally closed bypass valve means interconnecting the ends of said second cylinder, said command signal developing means further developing a second command signal representing desired movement of said arm from said first point to a second point along said second axis, second servo valve opening means responsive to said second command signal for opening said second servo valve means so that said arm is accelerated toward said second point in said second axis, second servo valve closing and second bypass valve opening means operative when the velocity of said arm in said second axis reaches a predetermined value for closing said second servo valve means and opening said second bypass valve means so that said arm moves toward said second point in said second axis without requiring additional energy from said pressurized source, and second bypass valve closing means for closing said second bypass valve means after said arm has moved to a predetermined position so that said arm is thereafter decelerated in said second axis to substantially zero velocity at said second point.

12. The combination of claim 11 wherein said schedule storage means further includes stored therein arm movement parameters representing desired deceleration characteristics of said manipulator arm in said second axis at corresponding positions of said manipulator arm in said second axis between said first and second points and which further includes second bypass valve control means responsive to said schedule storage means for opening said second bypass valve means when said manipulator deceleration in said second axis exceeds said desired deceleration characteristic and for closing said second bypass valve means when said manipulator deceleration is less than said desired deceleration characteristics.

13. A control arrangement for manipulator apparatus having a manipulator arm movable in a plurality of axes, a hydraulically actuated piston slidably mounted within a cylinder and connected to the arm, a servo valve arrangement for admitting fluid from a pressurized source to either end of the cylinder, and control circuitry responsive to a command signal for operating the servo valve to selectively accelerate and decelerate the manipulator arm, the control arrangement comprising:
bypass valve means for selectively interconnecting the ends of the cylinder, said bypass valve means having a sufficiently large area that substantially no braking effect is exerted thereby when said bypass valve means is fully open; and
control means for operating said selective interconnection means and overriding the control circuitry to close the servo valve, said control means comprising means for operating said selective interconnection means to interconnect the ends of the cylinder when the servo valve is closed for predetermined conditions wherein arm slewing movement at a predetermined velocity is desired and for operating said selective interconnection means to remove the interconnection of the cylinder ends when manipulator arm deceleration is desired.

14. A control arrangement for manipulator apparatus having a manipulator arm movable in a plurality of axes, a position encoder for outputting a signal representing the position of the arm, a hydraulically actuated piston slidably mounted within a cylinder and connected to the arm, a servo valve arrangement for admitting fluid from a pressurized source to either end of the cylinder, and control circuitry responsive to a command signal for operating the servo valve to selectively accelerate and decelerate the manipulator arm, the control arrangement comprising:
bypass valve means which is operable between open and closed positions for selectively interconnecting the ends of the cylinder, said bypass valve means having a sufficiently large area that substantially no braking effect is exerted thereby when said bypass valve means is fully open; and
control means for operating said bypass valve means and overriding the control circuitry to close the servo valve, said control means comprising means for overriding the control circuitry to close the servo valve when the velocity of the arm reaches a predetermined value and to open said bypass valve means to interconnect the ends of the cylinder, said control means further comprising deceleration schedule means for outputting control signals representing the desired deceleration of the manipulator arm at respective manipulator arm positions, said control means further comprising means for operating said bypass valve means to the closed position when the manipulator arm moves to a predetermined position and for thereafter operating said bypass valve means between the open and closed positions in accordance with said control signals from said deceleration schedule means.

15. A control arrangement for manipulator apparatus having a manipulator arm movable in a plurality of axes, a position encoder for generating manipulator arm position signals, a hydraulically actuated piston slidably mounted within a cylinder and connected to the arm, a servo valve arrangement for admitting fluid from a pressurized source to either end of the cylinder, and control circuitry responsive to a command signal for operating the servo valve to selectively accelerate and decelerate the manipulator arm, the control arrangement comprising:
bypass valve means which is operable between open and closed positions for selectively interconnecting the ends of the cylinder, said bypass valve means having a sufficiently large area that substantially no braking effect is exerted thereby when said bypass valve means is fully open;
schedule data means being responsive to manipulator arm position for outputting schedule data at respective manipulator arm positions, said schedule data including first schedule data representing servo valve closure and corresponding to a manipulator arm position at which the manipulator arm has attained a predetermined velocity after being accelerated by the operation of the servo valve and second schedule data representing a schedule of predetermined manipulator arm velocities at corresponding manipulator arm positions;
servo valve control means being responsive to said first schedule data for overriding the control circuitry and closing the servo valve; and
bypass valve control means for selectively operating said bypass valve means in accordance with said second schedule data, said bypass valve control means comprising comparator means for comparing said second schedule data with a representation of the manipulator arm velocity.

16. A control arrangement for manipulator apparatus having a manipulator arm movable in a plurality of axes, position encoder apparatus for generating manipulator arm position signals in at least two of the axes, at least two hydraulically actuated pistons lidably mounted within respective cylinders and connected to the arm to control movement in the two axes, a servo valve arrangement for each od the two axes for admitting fluid from a pressurized source to either end of a respective cylinder, and control circuitry responsive to command signals for operating the servo valves to selectively accelerate and decelerate the manipulator arm in the two axes, the control arrangement comprising:

bypass valve means for each of the two axes which is operable between open and closed positions for selectively interconnecting the ends of a respective cylinder, said bypass valve means having a sufficiently large area that substantially no braking effect is exerted thereby when said bypass valve means is fully open;

schedule data means being responsive to manipulator arm positions for outputting schedule data at respective manipulator arm positions in the two axes, said schedule data for each of the two axes including first schedule data representing servo valve closure and corresponding to a manipulator arm position at which the manipulator arm has attained a predetermined velocity in a respective axis after being accelerated by the operation of the servo valve and second schedule data representing a schedule of predetermined manipulator arm velocities at corresponding manipulator arm positions in a respective axis;

servo valve control means for each of the servo valves being responsive to said respective first schedule data for overriding the control circuitry and closing the respective servo valve; and bypass valve control means for each of said bypass valve means for selectively operating said respective bypass valve means in accordance with said respective second schedule data, each of said bypass valve control means comprising comparator means for comparing said second schedule data with a representation of the manipulator arm velocity in a respective axis.

17. The control arrangement of claim 16 wherein each of said bypass valve control means further includes a source of timing pulses and a counter responsive to said source of timing pulses and the manipulator arm position signals for a respective axis, said counter accumulating a count of the number of timing pulses that occur between successive position signals from the position encoder apparatus, said representation of manipulator arm velocity being developed by the accumulated count of said counter.

18. The combination of claim 1, which includes a source of clock pulses, counter means for counting said clock pulses, means for resetting said counter means each predetermined increment of movement of said arm along said axis, whereby the output of said counter is inversely proportional to the velocity of movement of said arm along said axis, and means utilizing said inverse velocity output to close said servo valve means and open said by pass valve means when the velocity of said arm reaches said predetermined value.

19. The combination of claim 18, which includes means utilizing said inverse velocity output for closing said bypass valve means after said arm has moved to said predetermined position.

20. The combination of claim 1, which includes means for developing an electrical signal when said arm has been accelerated to said predetermined velocity, a pressure regulating control valve for developing a predetermined control pressure in response to said electrical signal, and means for opening said by pass valve in response to said predetermined control pressure.

21. The combination of claim 1, which includes a solenoid operated pressure regulating control valve for developing a control pressure proportional to an electrical input signal supplied thereto, means for supplying said control pressure to said bypass valve means, means normally supplying a large amplitude electrical signal to said pressure regulating control valve so that said bypass valve means is closed, and means for reducing the amplitude of said electrical signal when said arm has been accelerated to said predetermined velocity so that said control pressure is reduced to a value at which said bypass valve means is opened.

22. In a programmable manipulator, the combination of, a manipulator arm movable in a plurality of axes, a piston slidably mounted within a cylinder and connected to said arm, servo valve means for admitting fluid from a pressurized source to either end of said cylinder to move said arm in either direction along a first of said axes, normally closed bypass valve means interconnecting the ends of said cylinder, said bypass valve means having a sufficiently large area that substantially no braking effect is exerted thereby when said bypass valve means is fully open, means for developing a command signal corresponding to a desired movement of said arm from a first point to a second point along said first axis, means responsive to said command signal for opening said servo valve means so that said arm is accelerated toward said second point, means for developing a position signal representing the position of said arm along said first axis as it moves toward said second point, first control means responsive to said position signal for closing said servo valve means and opening said bypass valve means so that said arm moves toward said second point without requiring additional energy from said pressurized source, and second control means responsive to said position signal and operative after said arm has moved to a predetermined position for successively closing and opening said bypass valve while maintaining said servo valve means closed so that said arm is thereafter decelerated to substantially zero velocity at said second point.

23. The combination of claim 22, which includes a source of clock pulses, counter means for counting said clock pulses, means for resetting said counter means each predetermined increment of movement of said arm along said axis, whereby the output of said counter is inversely proportional to the velocity of movement of said arm along said axis, and means utilizing said inverse velocity output to control said first and second control means.

24. The combination of claim 22, which includes schedule data storage means responsive to said position signal for outputting schedule data at respective manipulator arm positions, said schedule data including first schedule data for said first control means representing servo valve closure at a predetermined position and second schedule data for said second control means representing a schedule of predetermined manipulator arm velocities at corresponding manipulator arm positions.

25. The combination of claim 24, which includes bypass valve control means for selectively operating said bypass valve means in accordance with said second schedule data, said bypass valve control means including comparator means for comparing said second schedule data with a representation of the manipulator arm velocity.

* * * * *

UNITED STATES PATENT AND TRADEMARK OFFICE
CERTIFICATE OF CORRECTION

PATENT NO. : 4,581,893
DATED : April 15, 1986
INVENTOR(S) : Torsten H. Lindbom

It is certified that error appears in the above-identified patent and that said Letters Patent are hereby corrected as shown below:

Column 16, line 53, "characteristic" should read --characteristics--

Column 19, line 1, "lidably" should read --slidably--

Column 19, line 4, "od" should read --of--

Column 19, line 58, "by pass" should read --bypass--

Column 20, line 9, "by pass" should read --bypass--

Signed and Sealed this

Sixteenth Day of September 1986

[SEAL]

Attest:

DONALD J. QUIGG

Attesting Officer

Commissioner of Patents and Trademarks